Patented May 20, 1941

2,242,575

UNITED STATES PATENT OFFICE 2,242,575

PENTAMETHYLENEOXIDE COMPOUNDS AND A PROCESS OF PREPARING THEM

Otto Eisleb, Hofheim in Taunus, Germany, assignor to Winthrop Chemical Company, Inc., New York, N. Y., a corporation of New York No Drawing. Application March 14, 1939, Serial No. 261,775. In Germany March 16, 1938

4 Claims. (Cl. 260—333)

The present invention relates to pentamethyleneoxide compounds and pentamethylenesulfide compounds and to a process of preparing them.

I have found that pentamethyleneoxide compounds and pentamethylenesulfide compounds may be prepared in a simple manner by reacting a compound of the following general formula:

wherein X stands for oxygen or S, and Hlg stands for halogen, with an arylaceto-nitrile in the presence of an agent capable of splitting off hydrogen halide. In this manner compounds of the following general formula are obtained:

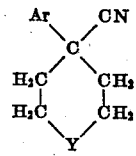

wherein Y stands for oxygen or S. The compounds containing sulfur may be oxidized with the aid of oxidizing agents into the corresponding sulfones of the general formula:

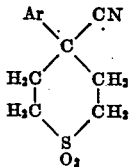

The nitriles corresponding to the two formulas named may be transformed into the corresponding amides, acids or esters. There are, for instance, obtained the 4-phenylpentamethyleneoxide-4-carboxylic acid nitrile from benzyl cyanide with beta-beta'-dichlorodiethyl ether and the 4-phenylpentamethylenesulfide-4-carboxylic acid nitrile with beta-beta'-dichloro-diethyl sulfide. The reaction is suitably carried out in a solvent such as benzene, toluene or xylene, and at an elevated temperature of between about 25° C. and 70° C. As agents capable of splitting off hydrogen halide there may, for instance, be used sodium or any active sodium compounds such as sodium amides or sodium phenylate.

The new compounds are for use as intermediate products for the manufacture of new remedies.

The following examples serve to illustrate the invention, but they are not intended to limit it thereto; the parts are by weight:

1. 84 parts of pulverized sodium amide are introduced in portions of about 1/10 of the entire quantity, while stirring and appropriately cooling, into a mixture of 117 parts of benzyl cyanide, 143 parts of beta-beta' dichlorodiethyl ether and 500 parts of toluene in such a manner that the temperature remains between 40° C. and 50° C. The mixture is then slowly heated to boiling and is boiled under reflux until ammonia no longer escapes (1 to 2 hours). After cooling, the toluene solution is shaken with water to dissolve the sodium chloride which has separated and distilled under reduced pressure. The 4-phenyl-pentamethyleneoxide-4-carboxylic-acid nitrile distils at 125° C. to 140° C. under a pressure of 2 mm. When again distilled it boils at about 133° C. under a pressure of 3 mm. and at about 147° C. to 148° C. under a pressure of 5 mm. and is a colorless liquid which when standing at room temperature soon solidifies completely in the form of tabular crystals. The yield amounts to about 50 per cent of the theory. It may be recrystallized from methyl alcohol or petroleum ether and melts at 49° C. to 50° C.

By heating the nitrile on the water bath for 2 hours with sulfuric acid of 66 per cent strength and precipitating it with water, the 4-phenyl-pentamethyleneoxide-4-carboxylic acid-amide is obtained which when recrystallized from methyl alcohol forms colorless crystals melting at 216° C. to 218° C.

By heating the last named product for 6 hours to 190° C. to 200° C. with methyl-alcoholic caustic potash solution it may be saponified to 4-phenylpentamethyleneoxide-4-carboxylic acid which crystallizes in colorless flakes from strongly aqueous methyl alcohol and melts at 128° C. to 130° C. The acid may be converted into alkamine esters which function as Novocaine analogs (see The Journal of the American Chemical Society, vol. 55, pages 365 to 370 inclusive). The chloride may be formed from the acid by means of thionyl chloride; it boils at 140° C. under a pressure of 3 mm., and melts at 53° C. to 54° C. The beta-diethylaminoethyl ester hydrochloride crystallizes from alcohol in the form of a colorless powder melting at 181° C.; the free base is an oily substance.

The 4-phenylpentamethyleneoxide-4-carboxylic acid is transformed into halogenated acids, which are obtained only as oils, by means of concentrated hydrogen halide at a raised temperature while splitting the oxide-ring. These halogenated acids may be transformed under suitable conditions with ammonia or primary amine into the 4-phenylpiperidine-4-carboxylic acids disclosed in U. S. Patent 2,167,351.

2. 84 parts of finely pulverized sodium amide are added, while stirring and cooling, to a mixture of 117 parts of benzyl cyanide and 500 parts of toluene so that the temperature does not exceed 40° C. When the reaction ceases to be exothermic 158 parts of beta-beta'- dichlorodiethyl sulfide are slowly added drop by drop while maintaining the temperature between 40° C. and 45° C. The mixture is then slowly heated to boiling and boiling under reflux is continued until ammonia no longer escapes (2 hours). After cooling the mixture it is shaken with water. The separate toluene solution yields when distilled under a pressure of 6 mm. the 4-phenylpentamethylenesulfide-4-carboxylic acid nitrile which for the main part distils at about 175° C. in the form of a colorless oil; the yield amounts to 47 per cent of the theory; after standing for a short time at room temperature it completely solidifies in the form of radiated crystals. Instead of the 158 parts of beta-beta'-dichloro-diethyl-sulfide there may, with the same success, be used 248 parts of beta-beta'-dibromo-diethylsulfide. From methyl alcohol the product crystallizes in colorless flakes melting at 56° C. to 57° C. By heating the nitrile to 85° C. in sulfuric acid of 80 per cent strength the 4-phenylpentamethylene-sulfide-4-carboxylic acid amide is obtained in the form of small prisms, melting at 158° C. to 159° C.

By saponifying the nitrile with methyl alcoholic caustic potash solution at 190° C. to 200° C. the 4-phenylpentamethylenesulfide-4-carboxylic acid is obtained which when crystallized from ethyl acetate forms a colorless crystalline powder melting at 157° C. to 158° C.

From the sulfides there are obtained by oxidation with permanganate or hydrogen peroxide at a raised temperature:

4-phenylpentamethylenesulfone - 4 - carboxylic acid nitrile, which when recrystallized from methyl alcohol forms colorless needles melting at 149° C.

4-phenylpentamethylenesulfone- 4 - carboxylic acid amide, which when recrystallized from acetic acid of 50 per cent strength or from butyl alcohol has a melting point at 237° C. to 238° C.; and 4-phenylpentamethylenesulfone - 4 - carboxylic acid, which when recrystallized from water forms colorless crystals melting at 215° C.

From the acid the 4-phenylpentamethylene-sulfone-4-carboxylic acid chloride is readily obtained with the aid of thionyl chloride (melting point 90° C. to 91° C.). The beta-diethylaminoethyl ester, formed from the chloride and beta-diethylaminoethanol, melts in the form of the base at 100° C. to 101° C. The hydrochloride thereof, crystallized from methyl alcohol, decomposes at 228 to 229° C.

I claim:
1. The process which comprises reacting a compound of the following general formula:

with an arylaceto-nitrile in the presence of an agent capable of splitting off hydrogen halide.

2. The process which comprises reacting a compound of the following general formula:

with an arylaceto-nitrile in the presence of sodium amide.

3. The compounds of the following general formula:

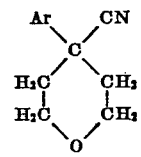

wherein Ar stands for aryl.

4. The compound of the formula:

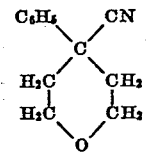

OTTO EISLEB.